United States Patent [19]
Ullrich

[11] Patent Number: 5,128,892
[45] Date of Patent: Jul. 7, 1992

[54] PARALLEL ADDER

[75] Inventor: Manfred Ullrich, Denzlingen, Fed. Rep. of Germany

[73] Assignee: Deutsche ITT Industries GmbH, Freiburg, Fed. Rep. of Germany

[21] Appl. No.: 688,187

[22] Filed: Apr. 19, 1991

[30] Foreign Application Priority Data

Apr. 25, 1990 [EP] European Pat. Off. ........ 90107878.2

[51] Int. Cl.$^5$ .............................................. G06F 7/50
[52] U.S. Cl. .............................. 364/786; 364/784
[58] Field of Search .............................. 364/786, 784

[56] References Cited

U.S. PATENT DOCUMENTS

| | | | |
|---|---|---|---|
| 4,471,454 | 9/1984 | Dearden et al. | 364/786 |
| 4,885,716 | 12/1989 | Little | 364/786 |
| 4,905,179 | 2/1990 | Licciardi et al. | 364/786 |
| 4,910,700 | 3/1990 | Hartley et al. | 364/754 |
| 5,010,509 | 4/1991 | Cox et al. | 364/784 X |

FOREIGN PATENT DOCUMENTS

| | | |
|---|---|---|
| 3540800 | 8/1987 | Fed. Rep. of Germany . |
| 58-10241 | 1/1983 | Japan . |

OTHER PUBLICATIONS

R. A. Allen et al., "Charged Coupled Devices in Digital LSI", *IEEE INTERNATIONAL ELECTRON DEVICES MEETING, TECHNICAL DIGEST*, Washington, D.C., Dec. 6-8, 1976, pp. 21-26.

Charles M. Lee et al., "Zipper MOS", *PROCEEDINGS OF THE IEEE* 1986 *CUSTOM INTEGRATED CIRCUITS CONFERENCE*, Rochester, N.Y., May 12-15, 1986, pp. 236-239.

Primary Examiner—Tan V. Mai
Attorney, Agent, or Firm—Thomas L. Peterson

[57] ABSTRACT

A parallel adder has a carry between adjacent adding stages. Each of the adding stages includes a carry-generating circuit which generates a carry output signal from carry input signals to be added by the adding stage and a carry input signal applied to it. The carry-generating circuit includes a complementary stage which is built with complementary transistors connected between the two terminals of a supply-voltage source. The carry-generating circuit has a center node which is connected to the carry output terminal and which, if the data input signals applied to the adding stage have the same binary state value, is at a potential corresponding to the binary state value. The carry-generating cricuit further includes a coupling circuit. One end of the coupling circuit is connected to one terminal of the supply-voltage source, and the other end of the coupling circuit is at the potential of the one terminal if the data input signals have unequal binary state values. The carry-generating circuit further includes a switching transistor whose main path is connected between the center node and the other end of the coupling circuit. The control electrode of the switching transistor is supplied with the carry input signal. Each adding stage further includes a presetting device whereby the adding stage, prior to its respective computing cycle, is placed in a preset state representing no carry output.

19 Claims, 5 Drawing Sheets

PARALLEL ADDER

BACKGROUND OF THE INVENTION

1. Field of the Invention

The present invention relates to a parallel adder with a carry between adjacent adding stages, each of which has two data input terminals and a carry-generating circuit having a carry input terminal and a carry output terminal. The carry-generating circuit generates a carry output signal from carry input signals to be added by the adding stage and a carry input signal applied to it.

2. Description of the Related Art

In modern computer technology, fast signal processing necessitates arithmetic/logic units (ALUs) which contain adders that are able to perform additions which also form the basis of the remaining arithmetic operations.

The function of such adders is to add N-bit data words, with the carry from the respective preceding stage being taken into account in calculating the respective next higher-order bit.

Serial adders are slow adders which process only one bit of the N-bit data word per clock pulse taking into account the carry. Parallel adders are faster and are therefore used in the ALUs of processors.

A fast method of parallel addition is known which uses "carry look ahead". In this method, a complex logic first determines all carries, and only then are the sums formed. As the number of bits per data word increases, the logic required to determine the carries becomes so complex that the arrangement becomes uneconomical.

Figure 1:
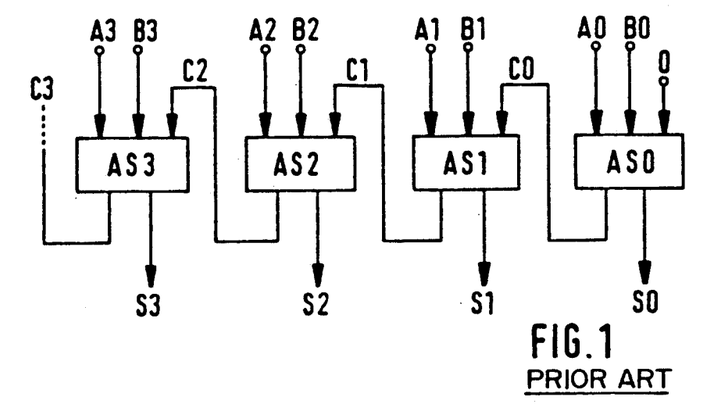
FIG. 1 shows a conventional four-stage parallel adder.

A parallel adder which requires no such complicated logic (i.e., no carry look ahead) uses a carry-handling method known as "ripple through". The present invention deals with such an adder, for which the basic structure is shown in FIG. 1. Such a parallel adder has a number of adding stages corresponding to the number of bits of the data words. Each of the adding stages is fed with two data input signals and a carry signal from which it forms a sum, and possibly generates a carry signal to be forwarded to the next adding stage. The two data input signals correspond to the binary state values having that significance within the data words to be added which is assigned to the respective adding stage. A given adding stage can perform its arithmetic operation only when it has received the carry signal from the preceding adding stage. Therefore, a corresponding time elapses until the final result of the computation performed by the parallel adder is available.

SUMMARY OF THE INVENTION

It is the object of the present invention to shorten the total computing time of a parallel adder with ripple-through carry. The invention is based on recognition that in a parallel adder with ripple-through carry, the total computing time is determined primarily by the time required to form the carry. The total computing time $Tt$ for an n-bit adder is $$Tt = Ts + (n-1)Tc$$

where $Tt$ = time until the appearance of the final result at the output of the parallel adder;

$Ts$ = time required by the highest-order adding stage to form its sum; and $Tc$ = time required to form the carry within an adding stage.

The above relation shows that the carry-generating time $Tc$ is proportional to the number of adding stages of the parallel adder. By shortening the time $Tc$, the total computing time of the parallel adder could thus be greatly reduced.

Modern computers are preferably implemented with CMOS technology. This technology is especially preferred because the power requirements of a CMOS stage are virtually limited to the switching operations. Outside the switching operations, practically no current flows, so that practically no power is dissipated. During each switching operation, the charges of the input capacitances of the transistors forming part of the CMOS stage must be reversed by the switching-signal source. In the case of a parallel adder, the switching-signal source is formed by the carry output of the respective preceding adding stage.

A fundamental idea of the present invention is to construct those subcircuits of each adding stage which are involved in forming the carry of the adding stage with fewer transistors so as to reduce the total input capacitance whose charge must be reversed by the carry output of the preceding adding stage. This fundamental idea led to the following measure according to the invention. Unlike the other subcircuits of the adding stage, that portion of the carry-generating subcircuit which processes the carry signal coming from the preceding adding stage is implemented not with complementary technology, but with transistors of only one conductivity type. However, a consequence of this measure is that the carry-generating circuit of the adding stage can be switched by the carry signal from the preceding adding stage in only one direction. According to the invention, this problem is overcome by placing the carry-generating circuit of each adding stage prior to the actual computing phase of this adding stage, in a so-called presetting phase, into the state in which it cannot be switched by the carry signal from the preceding adding stage. If the applied carry signal, in conjunction with the data input signals applied to the adding stage, results in a carry output corresponding to the preset state, this state will simply be preserved; otherwise, a change to the other state will take place.

The foregoing considerations are not limited to adders in CMOS technology but apply analogously to other technologies (e.g., push-pull bipolar circuits) where during switching operations the charges of input capacitances formed by depletion layers must be reversed.

The invention comprises a parallel adder with a carry between adjacent adding stages, each of which has two data input terminals. The parallel adder comprises a carry-generating circuit having a carry input terminal and a carry output terminal. The carry-generating circuit generates a carry output signal from carry input signals to be added by the adding stage and a carry input signal applied to it. The carry-generating circuit includes a complementary stage which is built with complementary transistors and is connected between the two terminals of a supply-voltage source. The carry generating circuit has a center node which is connected to the carry output terminal. If the data input signals applied to the adding stage have the same binary state value, the center node is at a potential corresponding to the binary state value. The carry-generating circuit further includes a coupling circuit, one end of which is connected to one terminal if the data input signals have unequal binary state values. The carry-generating circuit further includes a switching transistor whose main path is connected between the center mode and the other end of the coupling circuit. The control electrode is supplied with the carry input signal. Each adding stage further comprises a presetting device whereby the adding stage, prior to its respective computing cycle, is placed in a preset state representing no carry output.

Since the carry-generating circuit of each of the adding stages of the parallel adder according to the invention includes only one switching transistor which must be switched by the carry signal from the preceding adding stage, the input capacitance whose charge has to be reversed is reduced to one-half as compared to conventional push-pull technology, e.g., CMOS technology. This is accomplished by a correspondingly faster change to the non-preset state of the carry-generating circuit.

Depending on whether transistors of only one conductivity type or the other are used in the portion of the carry-generating circuit which responds to the applied carry signal, an adding stage is obtained which can only be switched from one binary state or the other. Thus, the state to which the carry-generating circuit is preset depends on the choice of the conductivity type of the transistors for this subcircuit. For simplicity, the terms "N-type adding stage" and "P-type adding stage" will be used in the following, depending on whether the subcircuit responding to the applied carry signal is built with P-channel transistors or N-channel transistors. If this subcircuit were implemented with technologies other than CMOS technology, e.g., bipolar technology, corresponding designations would have to be chosen.

In a preferred embodiment of the invention, successive stages of the parallel adder are formed alternately by an N-type adding stage and a P-type adding stage. This has the advantage that no carry inverters are needed between the individual adding stages. Such carry inverters are necessary if adding stages of the same type are connected in series.

In an especially preferred embodiment, the adding stages of the parallel adder are divided into two groups which are alternately operated in a presetting phase and a computing phase, with one group being operated in the computing phase while the other group is held in the presetting phase. In such an embodiment, the control logic for presetting the individual adding stages can be relatively simple. The division into two groups is preferably made in such a way that, in an ascending order of the adding stages, first only adding stages of one group and then only adding stages of the other group succeed one another. Preferably, the two groups have the same number of adding stages.

Adding stages belonging to different groups are preferably coupled together via a buffer device. With the buffer device, the carry generated by the preceding adding stage is stored during the phase change for the following adding stage entering the computing phase, the buffer device preferably being preset, like the adding stages, in a separate presetting phase. The buffer device prevents carries from being lost or erroneous carries from being formed during the phase changes.

In an especially preferred embodiment of the invention, the carry output signal from the adding stage for the most significant bit is made available to the carry input terminal of the lowest-order adding stage. This is done by means of a carry feedback circuit and preferably a carry selection circuit. As in the adding stages according to the invention, the carry output signal formed by the highest-order adding stage is advanced by a single transistor. Therefore, the carry feedback path, too, is preset in a presetting phase. Since this measure not only results in a fast transfer of the calculated carry to the next higher-order adding stage but also ensures that the carry from the highest-order adding stage resulting from the addition of two data words is quickly available to the carry input terminal of the lowest-order adding stage, this especially preferred embodiment is suited for fast accumulation of data words. In that case, the sum determined in an arithmetic operation is used as an addend for the subsequent arithmetic operation, and the carry output from the highest-order adding stage is applied to the carry input terminal of the lowest-order adding stage The especially preferred embodiment just described also permits a fast addition of data words each containing, for example, twice as many bits as the number of adding stages in the parallel adder. In such a case, first the least significant bits and then the high-order bits of the data words are added. The carry output signal from the highestorder adding stage which was determined during the addition of the less significant parts of the data words to be added is applied to the lowest-order adding stage through the carry feedback circuit and preferably through the carry selection circuit.

According to the invention, the carry selection circuit is supplied with the carry flag signal in addition to the carry output signal from the highest-order adding stage. By suitable control signals applied to the carry selection circuit, it can be determined whether the carry output signal from the highest-order adding stage, the carry flag signal, or a constant "0" or "1" is to be applied to the carry input terminal of the lowest-order adding stage.

Further advantageous features of the invention will be described hereinafter.

BRIEF DESCRIPTION OF THE DRAWINGS

The invention as well as further aspects of its object and advantages will become more apparent from the following description of embodiments taken in conjunction with the accompanying draw which.

DETAILED DESCRIPTION OF THE PREFERRED EMBODIMENTS

A conventional parallel adder is shown in FIG. 1. The conventional parallel adder has four adding stages AS0, AS1, AS2 and AS3 which add a first data word comprising bits A0, A1, A2, A3 and a second data word comprising bits B0, B1, B2, B3. The indices 0, 1, 2 and 3 are assigned to the individual adding stages in ascending order. Each adding stage provides at its output end a sum signal and a carry signal. The sum signals from all four adding stages form the data word of the sum total calculated by the parallel adder. The carry output signal from each adding stage is applied to the next adding stage, so that each adding stage can also process the carry from the previous adding stage. The carry input terminal of the adding stage for the least significant bit, i.e., of the adding stage AS0, is constantly supplied with the data value "0".

Figure 2:
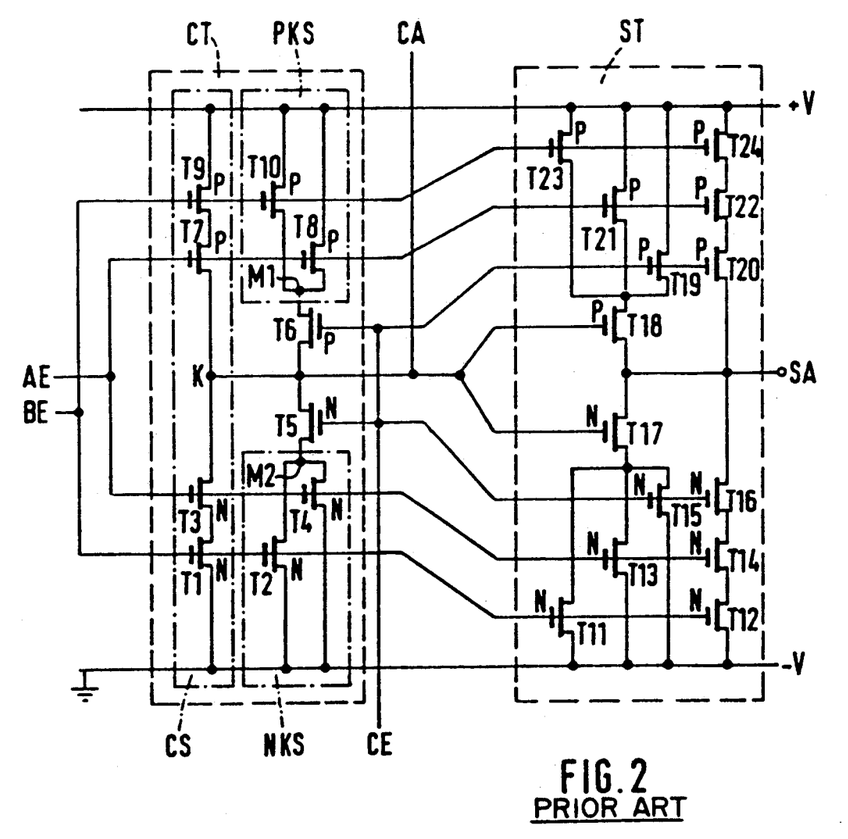
FIG. 2 shows an adding stage of the parallel adder of FIG. 1.

Each of the adding stages AS0 through AS3 is constructed as shown in FIG. 2. This adding stage has two data inputs AE and BE, which are supplied with the data values to be added. The sum calculated by this adding stage is available at the sum output SA. The adding stage receives the carry signal from the preceding adding stage via a carry input CE and delivers its carry signal to the next adding stage via a carry output CA.

The adding stage has a summing circuit ST and a carry-generating circuit CT. Both are connected between a positive terminal +V and a negative terminal −V of a supply-voltage source.

The carry-generating circuit CT contains a complementary stage CS, two coupling stages PKS, NKS, and two switching transistors T5 and T6.

The summing circuit ST forms the sum of the data input signals applied to the two data inputs AE and BE, taking into account a carry from a preceding adding stage, which is applied via the carry input CE, and a carry formed by the carry-generating circuit CT from the data input signals. As the present invention relates to the carry-generating circuit CT, the design and operation of the summing circuit ST need not be described here in detail.

The complementary stage CS in the carry-generating circuit CT comprises a series combination of two P-channel transistors T7, T9, connected to the positive terminal +V, and a series combination of two N-channel transistors T1, T3, connected to the negative terminal −V. The two series combinations are connected together at a center node K.

The carry-generating circuit CT further includes a P coupling circuit PKS and an N coupling circuit NKS. The P coupling circuit PKS contains two parallel-connected P-channel transistors T8 and T10 which are coupled to the positive terminal +V at one end and connected together at a node M1 at the other end. The control electrodes of these two transistors are connected to the two data input terminals AE and BE, respectively. The N coupling circuit NKS contains a parallel combination of two N-channel transistors T2 and T4 which are tied to the negative terminal −V at one end and connected together at a node M2 at the other end. The control electrodes of these two transistors are connected to the data input terminals BE and AE, respectively.

A series combination of a P-channel transistor T6 and an N-channel transistor T5 is interposed between the nodes M1 and M2. The junction point of these two transistors is connected, on the one hand, to the center node K of the complementary stage CS and, on the other hand, both to the carry output terminal CA and to the summing circuit ST. The control electrodes of the transistors T5 and T6 are connected in common to the carry input terminal CE.

The operation of the carry-generating circuit CT is as follows.

If the binary values of the two data input signals applied at AE and BE are equal, either the P-channel transistors T7, T9 or the N-channel transistors T1, T3 of the complementary stage CS conducts, so that the potential at the center node K is approximately equal to either that at the terminal +V or that at the negative terminal −V. Consequently, the carry output terminal CA is at a potential corresponding to the binary value of the two data input signals. If the binary values of the two data input signals are unequal, two of the four series-connected transistors of the complementary stage CS turn off, so that the center node K is held at the previously existing potential.

If the binary values of the two data input signals are unequal, one of the two transistors in each of the two coupling circuits PKS and NKS conducts, so that the potentials at the nodes M1 and M2 assume essentially the values of the potentials at the positive terminal +V and the negative terminal −V, respectively. If the binary values of the data input signals are equal, the two transistors of one coupling circuit or the other conduct, while the transistors of the respective other coupling circuit are off, i.e., one of the two nodes M1 and M2 assumes essentially the potential of the adjacent terminal of the voltage source, whereas the potential at the other node remains indeterminate.

If the binary values of the two data input signals are equal, the potential and, hence, the binary value of the carry output signal are determined by the potential at the center node K. If the two data input signals are "0", the center node K is at a positive potential, so that a "1" appears at the carry output terminal CA. If the two data input signals are "1", the center node K is at a negative potential, so that a "0" appears at the carry output terminal CA. The carry signal thus appears at the carry output terminal CA in inverted form.

The switching transistors T5 and T6 become effective if the data input signals have unequal binary values. Then, one end of the series combination of T5 and T6 is at the potential of +V, and the other end at the potential of −V. If a carry input signal with the binary value "0" is applied through the carry input terminal CE, the transistor T6 is on, while the transistor T5 is off. Consequently, the potential at the carry output terminal CA assumes the value of the potential of +V, i.e., the binary value "1". If the carry input signal is "1", the transistor T5 is on, while the transistor T6 is off. Consequently, a "0" appears at the carry output terminal CA.

In the foregoing, it was assumed that the binary "1" is assigned to a high voltage level. The reverse assignment is also possible.

If the binary value of the carry input signal applied at the carry input CE changes, the two transistors T5 and T6 must be switched. This means that the charges of the input capacitances of the two transistors must be reversed. A switching time results, into which the sum of these two input capacitances enters. This switching time determines Tc in the equation given at the beginning, i.e., the value of this switching time is an essential factor determining the total computing time Tt of the adder.

Figure 3:
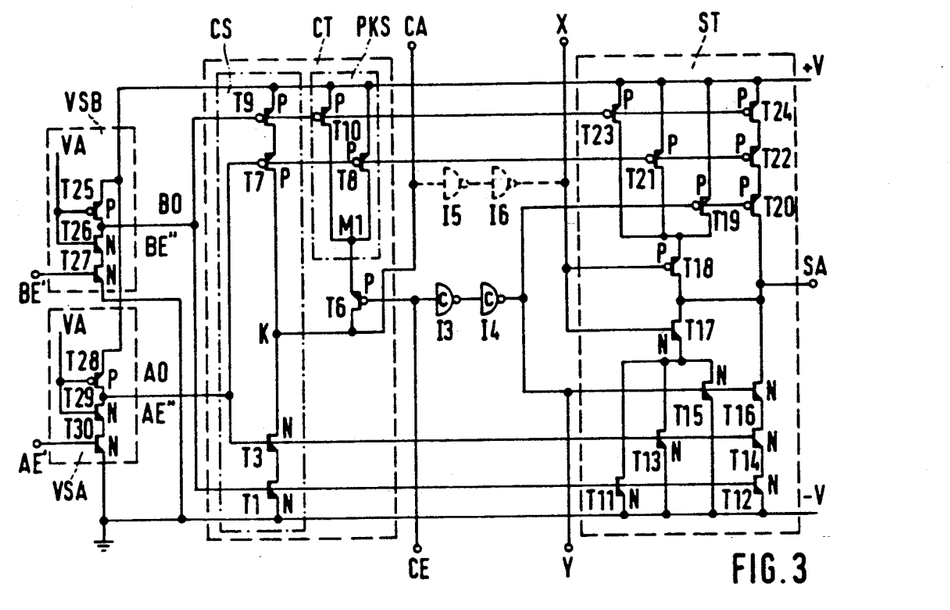
FIG. 3 shows a P-type adding stage in accordance with the invention.

FIG. 3 shows a P-type adding stage in accordance with the present invention. This stage, like the adding stage of FIG. 2, is basically implemented using CMOS technology. Its summing circuit ST and the complementary stage CS in the carry-generating circuit CT are identical to the corresponding circuits in FIG. 2. The carry-generating circuit CT of FIG. 3 differs from the carry-generating circuit CT of FIG. 2 in that it includes only a P coupling circuit PKS and a P-channel switching transistor P6, while the N coupling circuit NKS and the N-channel switching transistor T5 are no longer present.

In addition, the circuit of FIG. 3 differs from the conventional adding stage in the design of its input section. In the input section, a presetting stage VSA, VSB is associated with each data input terminal AE', BE'. The presetting stages VSB and VSA comprise a series combinations of three transistors T25, T26, T27, and T28, T29, T30, respectively, which are each connected between the two terminals $+V$ and $-V$. The transistors adjacent to $+V$ (i.e., T25 and T28) are P-channel transistors, while the remaining transistors of each presetting stage are N-channel transistors. In each presetting stage VSA, VSB, the control electrode of one of the two N-channel transistors (i.e., T30 and T27) is connected to the respective input terminal AE', BE'. The control electrodes of the two other transistors of each presetting stage (i.e., T28, T29 and T25, T26) are connected to a preset terminal VA which is coupled to a presetting-signal source (not shown in FIG. 3). The junction point of the two transistors whose control electrodes are connected in common to VA is connected to the control electrodes of two transistors of the complementary stage CS.

As in the conventional adding stage of FIG. 2, the carry input terminal CE is connected to the control electrodes of P-channel transistors T19, T20 and to the control electrodes of N-channel transistors T15, T16 of the summing circuit ST, so that the carry from the preceding adding stage can be taken into account during summation. In the circuit according to the invention, two inverters I3 and I4 are included in this connection.

The operation of the summing circuit ST in the adding stage according to the invention is the same as in the conventional circuit, so that no further explanation is necessary. Because of the different design of the carry-generating circuit CT and the provision of the presetting stages VSA and VSB, the operation of the adding stage of FIG. 3 is as follows.

The following again assumes that the binary "1" is assigned to a high voltage level and the binary "0" to a low voltage level.

First it is assumed that a binary "1" is applied at the preset inputs VA. The potential at a junction point BE" between the transistors T25 and T26 and the potential at a junction point AE" between the transistors T28 and T29 then depends on the respective binary value at the data input terminals BE' and AE', respectively. If the junction points BE" and AE", have equal binary values, the circuit of FIG. 3 behaves in the same way as the conventional circuit of FIG. 2. If both binary values are "0", the center node K and, hence, the carry output terminal CA assume the binary value "1". A "1" at both the junction point AE" and the junction point BE" will cause a "0" to appear at the carry output terminal CA.

Because of the presetting stages VSB and VSA, an inversion of the data input signals occurs between the data input terminal BE' and the junction point BE" and between the data input terminal AE' and the junction point AE", respectively. With respect to the data input terminals AE' and BE', the noninverted carry output signal appears at the carry output terminal CA. In the conventional circuit of FIG. 2, the carry output signal appears at the carry output terminal CA in inverted form if the data input signals at the data input terminals AE and BE are equal.

If data input signals with unequal binary values are applied at the data input terminals AE' and BE' of the circuit of FIG. 3, unequal binary values appear at the junction points AE" and BE". In the presence of such data input signals, of the four transistors of the complementary stage CS, at least two transistors of different conductivity type remain off. Consequently, the center node K remains either at "0" or at "1", depending on which equal binary value the two data signals previously had. Since data input signals with unequal binary values are now present, one of the two P-channel transistors of the P coupling circuit PKS conducts, so that approximately the potential of the positive terminal $+V$ appears at the node M1.

Depending on the value of the carry from the preceding adding stage, a binary "0" or a binary "1" can now appear at the carry input terminal CE and, hence, at the control electrode of the switching transistor T6. A low potential, i.e., a "0", at the center node K will cause the switching transistor T6 to be turned on if a "0", i.e., a low potential, is applied at the carry input terminal CE. The transistor T6 then gates the positive potential from the node M1 to the center node K, so that the carry output terminal CA is at a high potential, corresponding to a binary "1". If, in the state in which the center node K is at a low potential, a positive potential, corresponding to a binary "1", is applied at the carry input terminal CE, the switching transistor T6 will remain cut off. Consequently, there will no change in the potential at the center node K, and the carry output terminal CA will be held at "0".

If the center node K is at a high potential, corresponding to a binary "1", both the source electrode and the drain electrode of the switching transistor T6 are at a high potential, so that the transistor T6 cannot be switched, regardless of which carry signal is applied at the carry input terminal CE. Thus, if the center node K is at "1", the binary value at the carry output terminal CA is no longer switchable. Consequently, it is no longer ensured that the correct carry value is being formed by the carry-generating circuit.

In such an adding stage, a state may thus occur in which, to form a correct carry, the switching transistor T6 would have to be switched but is not switchable. According to the invention, this problem is overcome by the presetting circuit. With this circuit, before the commencement of the computing phase proper, the adding stage is placed in a state in which the center node K is at that potential — namely a low potential corresponding to a binary "0" — at which the switching transistor T6 can be switched. A low potential at the center node K will result if both the junction point AE" and the junction point BE" are at a high potential, corresponding to a binary "1". This state is forced by applying a low potential, corresponding to a binary "0", to the preset terminals VA of the presetting stages VSA and VSB, so that the P-channel transistors T28 and T25, respectively, are on and the N-channel transistors T29 and T26, respectively, are off. The potential at the positive terminal +V is thus transferred to the junction points AE" and BE" via the transistors T28 and T25, respectively. The binary values at the data input terminals BE' and AE' have no effect, since the transistors T29 and T26 are off.

As a result of this presetting during a presetting phase, the adding stage starts each computing phase with that state of the carry-generating circuit CS from which the switching transistor T6 can be switched.

Figure 4:
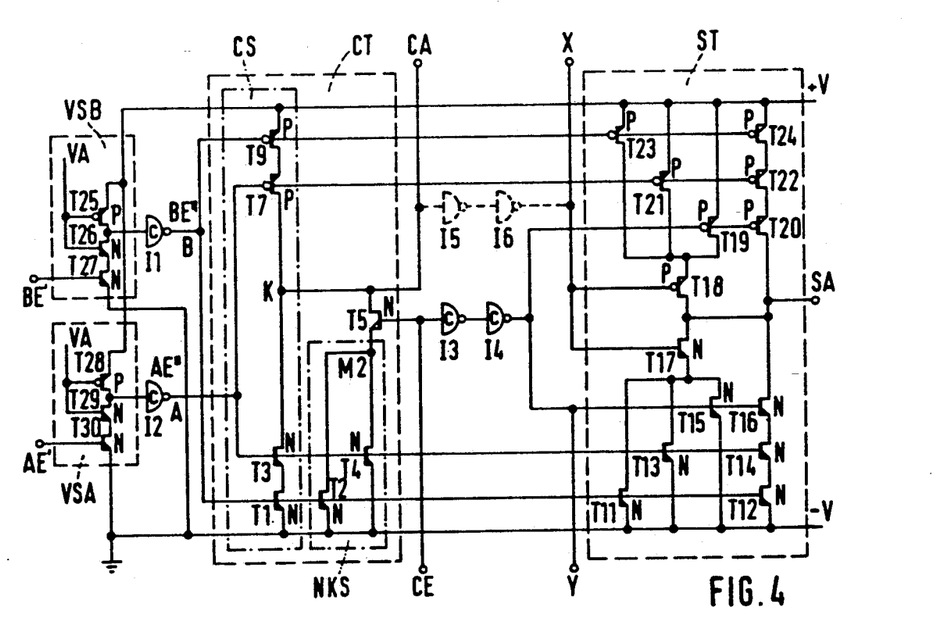
FIG. 4 shows an N-type adding stage in accordance with the invention.

FIG. 4 shows an embodiment of an N-type adding stage. The adding stage of FIG. 4 is largely identical to the P-type adding stage shown in FIG. 3. The only differences are that an N coupling circuit NKS is present instead of a P coupling circuit; that the switching transistor T5 is an N-channel transistor; and that an inverter I1 is interposed between the presetting stage VSB and the branch point BE" and an inverter I2 is interposed between the presetting stage VSA and the branch point AE".

Since the conductivity types of the switching transistor and the coupling-stage transistors in the N-type adding stage of FIG. 4 are opposite to those in the P-type adding stage of FIG. 3, and since the N coupling stage NKS is connected to the negative terminal −V, the center node K must be preset to a high potential, corresponding to a binary "1", to ensure that the switching transistor T5 can be switched if this is necessary because of the binary value of the applied carry signal.

In both types of adding stages, the presetting circuit thus causes the carry-generating circuit to be placed in the state in which it could not be switched by the applied carry signal. If, during the subsequent computing phase, the applied carry signal requires that the carry-generating circuit should be in this state, the state of the carry-generating circuit caused by the presetting will simply be maintained. If the applied carry signal requires that the carry-generating circuit should be in the other state, changeover will take place.

A parallel adder is preferably constructed so that adding stages of opposite conductivity type succeed one another, i.e., a P-type adding stage is followed by an N-type adding stage which is, in turn, followed by a P-type adding stage. This construction has the advantage that no inverter is required between the carry output terminal and the carry input terminal of the respective successive stages. While the P-type adding stage must be fed with the inverted carry input signal and delivers at its output the noninverted carry output signal, the N type adding stage must be fed with the carry input signal in noninverted form while delivering the carry signal at its carry output terminal in inverted form.

A further improvement in processing speed is achieved by coupling the carry input terminal CE and the carry output terminal CA of each adding stage to the summing circuit ST through a load buffer device. In the preferred embodiments of FIGS. 3 and 4, the load buffer device is formed by a series combination of two inverters I3 and I4. The load buffer device prevents the input capacitance of the switching transistor of its own and the next adding stage from being loaded by the summing circuit more than is necessary.

In the embodiment of FIG. 4, in addition to the inverters I3 and I4 connected between the control terminal of the switching transistor T5 and the control terminals of the transistors T15, T16 and T19, T20 of the summing circuit ST, a series combination of two additional inverters I5 and I6 (shown by dashed lines) is provided which is connected between the center node K and the control terminals of the transistors T17 and T18 of the summing circuit ST.

The series combination of the inverters I5 and I6 is shown by dashed lines because it is not present in the preferred embodiment. Its function is performed by the inverters I3 and I4 of the next adding stage. To this end, each adding stage has an output terminal Y connected to the output of the inverter I4 and an input terminal X connected to the control electrodes of the transistors T17 and T18 of the summing circuit ST. The input terminal X of an adding stage is connected to the output terminal Y of the respective following adding stage.

Figure 5:
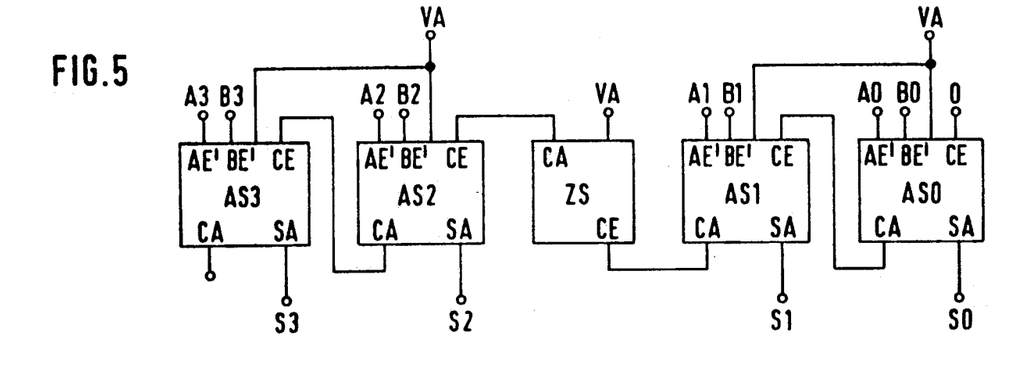
FIG. 5 shows a four-stage parallel adder in accordance with the invention.

An embodiment of a parallel adder with four adding stages is shown in FIG. 5. In this embodiment, adding stages AS0 and AS1 form a first group, and adding stages AS2 and AS3 form a second group. In each group, the two adding stages are operated simultaneously in the presetting phase and the computing phase. While one group is in the presetting phase, the other group is operated in the computing phase.

A buffer device ZS is provided between the two groups to temporarily store the carry generated by the higher-order adding stage AS1 of the first group during the computing phase of the first group, and then pass the carry to the lower-order adding stage AS2 when the second group comprising the adding stages AS2 and AS3 has changed from the presetting phase to the computing phase. This prevents the loss or erroneous generation of carries during the phase reversals of the two groups.

Each of the two groups has a preset terminal VA, which is supplied with the presetting signal, during which the respective other group is in the computing phase.

Figure 6:
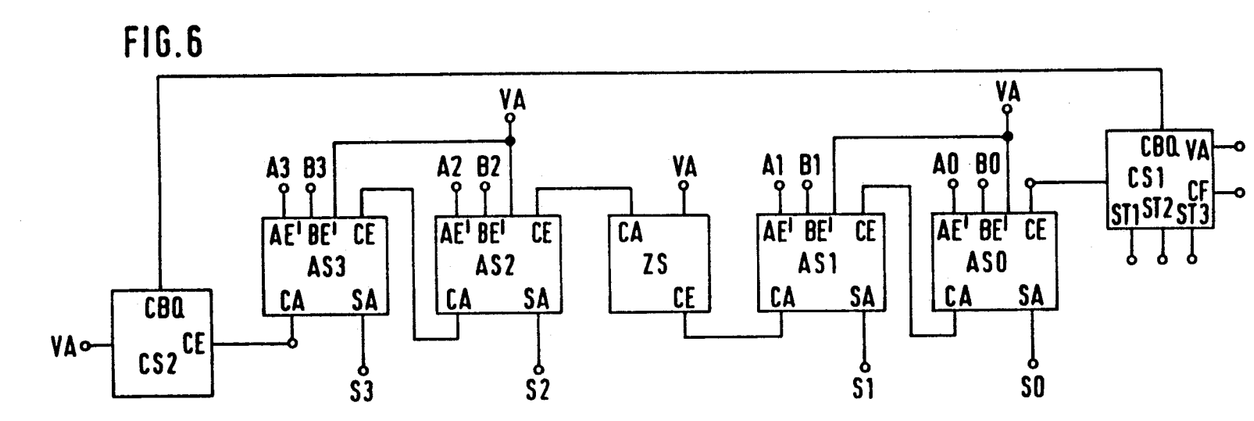
FIG. 6 shows an especially preferred embodiment of a four-stage parallel adder in accordance with the invention.

An especially preferred embodiment of a parallel adder with four adding stages is shown in FIG. 6. In this embodiment, the carry output signal generated in the highest-order adding stage AS3 is applied to an input CE of a carry feedback circuit CS2, which previously changed an output CBQ to a state indicating no carry by means of a presetting signal applied to an input VA. A carry selection circuit CS1 is coupled to the carry feedback circuit CS2 and thus is supplied with the carry output signal from the highest-order adding stage AS3. The carry selection circuit CS1 is also supplied with a presetting signal at an input VA, the carry flag signal at an input CF, and control signals at inputs ST1, ST2 and ST3. The control signals serve to select the carry signal to be applied to the carry input terminal CE of the lowest-order adding stage AS0.

Figure 8:
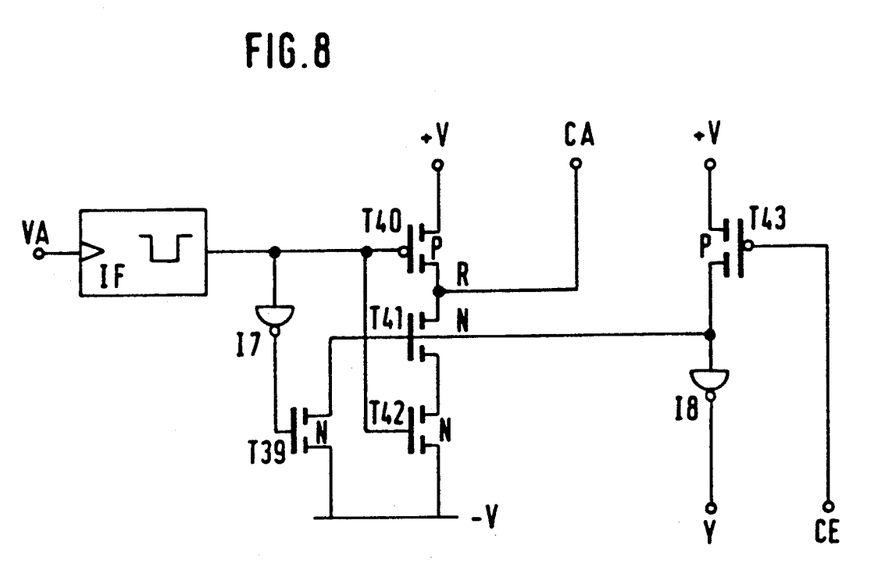
FIG. 8 shows a buffer circuit in accordance with the invention.

In a presetting phase of its own, the buffer device ZS is prepared for the transfer of the carry. At the time the highest-order adding stages are switched to the presetting phase, the buffer device ZS is also in its presetting phase. The presetting phase of the buffer device ZS must, however, be terminated before the carry output signal generated by the lower-order adding stage connected to the buffer device ZS is applied to the input CE of the buffer device ZS. According to the invention, the buffer device ZS is preferably designed as shown in FIG. 8. Use is made of a series combination of a P-channel transistor T40 and two N-channel transistors T41 and T42, wherein the P-channel transistor T40, which is connected to the positive terminal +V, and the N-channel transistor T42, which is connected to the negative terminal −V, are driven jointly by the output of a pulse-shaping stage IF having its input connected to a presetting-signal source. The control electrode of the middle, N-channel transistor T41 of the series combination is connected, on the other hand, to the output of an N-channel transistor T39 driven by the output of the pulse-shaping stage IF and, on the other hand, to the summing circuit ST of the preceding adding stage via the output of an inverter stage I8 and to one main electrode of a P-channel transistor T43, whose second main electrode is connected to the positive terminal +V of the supply-voltage source. The carry input terminal CE, which is connected to the carry output terminal of the preceding adding stage, is coupled to the control electrode of the switching transistor T43. The carry output terminal CA is connected to the carry input terminal of the next adding stage and is coupled to the connection between the P-channel transistor T40 and the middle, N-channel transistor T41 of the series combination to form a node R. To preset the buffer circuit ZS, the pulseshaping circuit IF, after being started by the presettingsignal source, connects its output to zero potential, thus clamping the node R to a level representing a binary "1". This causes a binary "1" to appear at the output of the N-channel transistor T39 and at the output Y via the inverters I7 and I8, respectively. The buffer circuit ZS remains in this preset state until switched by a carryindicating signal applied at its input CE. The zeropotential pulse at the output of the pulse-shaping circuit IF is terminated before the carry output signal generated by the preceding adding stage is applied at the input CE of the buffer circuit ZS. After the presetting phase, the transistor T42 conducts, so that, when the high-speed P-channel switching transistor T43 is switched into the conducting state by a binary "0", which indicates a carry, the transistor T41 also conducts so that a binary "0" is transferred via the node R to the output CA of the buffer circuit ZS. A logic "0" appears at the output Y via the inverter I8.

Figure 7A:
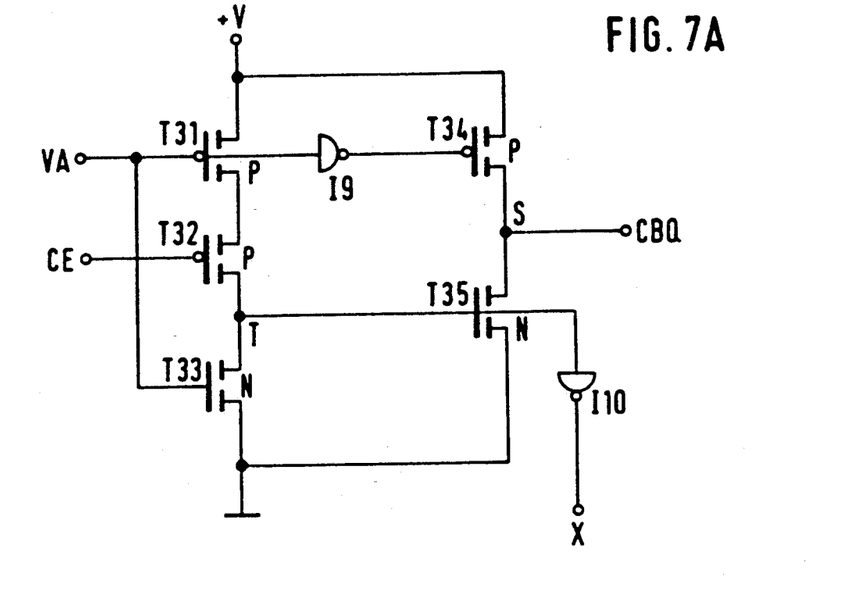
FIG. 7A shows a carry feedback circuit in accordance with the invention that can be used in the parallel adder of FIG. 6.
Figure 7B:
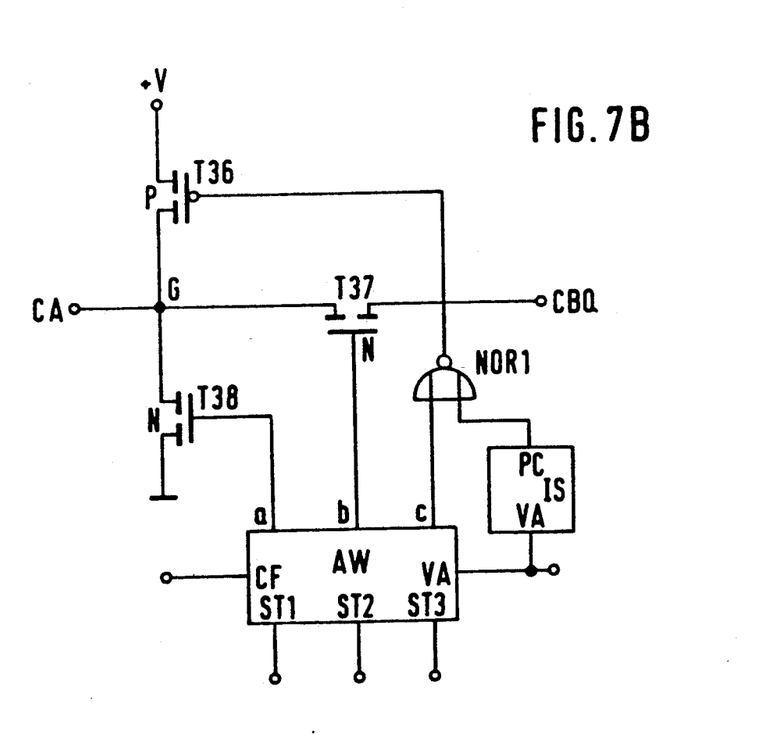
FIG. 7B shows a carry selection circuit in accordance with the invention that can be used in the parallel adder of FIG. 6.

The carry feedback circuit CS2 and the carry selection circuit CS1 shown in FIGS. 7A and 7B, respectively, represent subcircuits of a preferred embodiment of the invention. With the help of the two circuits, the carry output signal of the highest-order adding stage is made available to the carry input terminal of the lowest-order adding stage. The carry selection circuit CS1 of FIG. 7B makes it possible to select the carry signal to be applied to the carry input terminal; this is done by applying suitable control signals to the inputs ST1, ST2, ST3. To ensure that, if the carry output signal is to be applied to the highestorder adding stage, this can be done just as fast as the calculated carry output signals are transferred from adding stage to adding stage, this portion of the parallel adder, too, must be so designed that the carry output CBQ is preset. Like the carry output signals of the adding stages, this carry output signal can be switched in only one direction, which, in the case of the carry feedback circuit CS2, is only from the state indicating no carry, the binary "1", to the state indicating a carry, the binary "0".

The carry feedback circuit CS2 of FIG. 7A includes a series combination of an N-channel transistor T33 and two P-channel transistors T31 and T32. The N-channel transistor T33, which is connected to the negative terminal −V, and the P-channel transistor T31, which is connected to the positive terminal +V, are driven jointly by a presetting-signal source via the terminal VA. The control electrode CE of the middle, P-channel transistor T32 of the series combination is supplied with the carry output signal from the highest-order adding stage. A further series combination of a P-channel transistor T34 and an N-channel transistor T35 is connected between the positive terminal +V and the negative terminal −V of the supply-voltage source. One main electrode of the P-channel transistor T34 is connected to the positive terminal +V. The second main electrode of the transistor T34, one main electrode of the N-channel transistor T35 and the output CBQ of the carry feedback circuit are connected together and form a node S. The control electrode of the P-channel transistor T34 is connected via an inverter I9 to the control electrode of the P-channel transistor T31 of the series combination of three transistors. The node T formed by one main electrode of the P-channel transistor T32, one main electrode of the N-channel transistor T33, and the control electrode of the N-channel transistor T35 is connected via an inverter I10 to the output X, which applies the carry calculated in this stage to the summing circuit ST of the highest-order adding stage.

The embodiment of the carry selection circuit CS1 shown in FIG. 7B includes a series combination of a P-channel transistor T36, which is connected to the positive terminal +V, and an N-channel transistor T38, connected to the negative terminal −V. One main electrode of the N-channel transistor T37 is connected to a junction point G of the transistors T36 and T38. The transistor T37 applies the carry output signal to the highest-order adding stage. The carry selection circuit CS1 includes a selection logic AW which evaluates the control signals applied at its inputs ST1, ST2, ST3, the carry flag signal and the presetting signal, and selects the transistors T36, T37, T38 of the carry selection circuit CS1 via selection logic signals a, b, c in such a way that, depending on the combination of the respective control signals, either the carry output signal CBQ applied from the carry feedback circuit CS2 is transferred through the transistor T37 to the carry output CA of the carry selection circuit CS1, or one of the transistors T36 or T38 is driven so as to cause a constant binary "0" or "1" or the carry flag signal CF to appear at the carry output CA.

The carry selection circuit CS1 further includes a pulse shaper I8 which is driven by the presetting signal and which renders the transistor T36 conductive for a short time by means of a "0" applied via a NOR-gate NOR1 to preset the node G. This is necessary if the carry comes from the carry output signal CBQ.

What is claimed is:

1. A parallel adder comprising:
a plurality of adder stages having a carry between adjacent adding stages, each of said adding stages having two data input terminals, each adding stage comprising:
a summing circuit;
a carry-generating circuit having a carry input terminal and a carry output terminal, said carry-generating circuit for each adding stage generating a carry output signal from data input signals to be added by the adding stage and a carry input signal applied to said carrying-generating circuit, said carygenerating circuit comprising: positive and negative voltage terminals for connecting to a supply-voltage source;
a complementary stage comprising complementary transistors connected between said voltage terminals, said complementary stage having a center node connected to said carry output terminal, said complementary stage operating to cause said center node to have a potential corresponding to a binary state value when said data input signals applied to said adding stage have equal binary state values;

a coupling circuit having a first end connected to one of said voltage terminals and having a second end at the potential of said one voltage terminal when said data input signals have unequal binary state values; and a switching transistor, the main path of said switching transistor connected between said center node and said second end of said coupling circuit, said switching transistor having a control electrode supplied with said carry input signal; and a presetting device that places said center node in a present binary state representing no carry output prior to a computing cycle performed by said adding stage.

2. A parallel adder as defined in claim 1, wherein said plurality of adding stages are realized using CMOS technology.

3. A parallel adder as defined in claim 1, wherein:
said one voltage terminal to which said first end of said coupling circuit is connected is said positive voltage terminal; and
said coupling circuit comprises P-channel transistors, and said switching transistor comprises a P-channel transistor.

4. A parallel adder as defined in claim 3, wherein the carry input terminal of a respective following adding stage is connected to the carry output terminal of the respective preceding adding stage via an inverter device.

5. A parallel adder as claimed in claim 1, wherein:
said one voltage terminal to which said first end of said coupling circuit is connected is said negative voltage terminal; and
said coupling circuit comprises N-channel transistors, and said switching transistor comprises an N-channel transistor.

6. A parallel adder as defined in claim 5, wherein the carry input terminal of a respective following adding stage is connected to the carry output terminal of the respective preceding adding stage via an inverter device.

7. A parallel adder as defined in claim 1, wherein:
in the carry-generating circuit of a first adding stage:
said one voltage terminal to which said first end of said coupling circuit is connected is said positive voltage terminal; and
said coupling circuit comprises P-channel transistors, and said switching transistor comprises a P-channel transistor;
in the carry-generating circuit of a second adding stage adjacent to said at least one adding stage:
said one voltage terminal to which said first end of said coupling circuit is connected is said negative voltage terminal; and
said coupling circuit comprises N-channel transistors, and said switching transistor comprises an N-channel transistor;
and
said parallel adder comprises alternating first adding stages and said second adding stages.

8. A parallel adder as defined in claim 1, wherein:
said complementary stage comprises:
a first series combination of two P-channel transistors, said first series combination connected to said positive voltage terminal; and
a second series combination of two N-channel transistors, said second series combination connected to said negative voltage terminal;
said center node comprises the junction point of said first and second series combinations; and
in said first and second series combinations, the control electrode of one transistor is coupled to one data input terminal and the control electrode of the other transistor is coupled to the other data input terminal.

9. A parallel adder as defined in claim 1, wherein said coupling circuit comprises a parallel combination of two transistors having control electrodes coupled to said one data input terminal and said other data input terminal, respectively.

10. A parallel adder as defined in claim 1, wherein said switching transistor comprise an MOS transistor having a source electrode coupled to said second end of said coupling circuit, having a drain electrodes coupled to said center node, and having a gate electrode coupled to said carry input terminal.

11. A parallel adder as defined in claim 1, wherein said presetting device is responsive to a presetting-signal and comprises a presetting circuit controlled by said presetting-signal, said presetting circuit causing said data input signal to become effective for the adding stage in a computing phase of the adding stage, and holding the adding stage in the preset state in a presetting phase.

12. A parallel adder as defined in claim 11, wherein said adding stages are divided into two groups, said two groups being alternately operated in a presetting phase and a computing phase, with one of the groups being in its computing phase while the respective other group is held in its presetting phase.

13. A parallel adder as defined in claim 12, wherein successive adding stages belong to different groups, and the carry output terminal of a preceding adding stage is coupled to the carry input terminal of a succeeding adding stage via a buffer device which temporarily stores the carry from the preceding adding stage during the phase change for the succeeding adding stage entering into the computing phase.

14. A parallel adder as defined in claim 13, wherein the buffer device places its carry output in a preset state representing no carry before receiving the carry output signal from the preceding adding stage, and, after receipt of output signal until the next preparation phase of the buffer 15. A parallel adder as defined in claim 14, wherein said buffer device comprises:
a series combination of a P-channel transistor and first and second N-channel transistors, each having first and second main electrodes and a gate electrode, said first main electrode of said P-channel transistor connected to said positive voltage terminal, said second main electrode of said P-channel transistor connected to said first main electrode of said first N-channel transistor and to an output node that provides a carry output to the next succeeding adding stage, said second main electrode of said first N-channel transistor connected to said first main electrode of said second N-channel transistor, and said second main electrode of said second N-channel transistor connected to said negative voltage terminal;

a pulse shaper having an input responsive to a presetting signal and having an output, the gate electrode of said P-channel transistor and the gate electrode of said second N-channel transistor being driven jointly by said output of said pulse shaper;

a first inverter having an input connected to said output of said pulse shaper and having an output;

a third N-channel transistor having first and second main electrodes and a gate electrode, said gate electrode connected to said output of said first inverter, said second main electrode connected to said negative voltage terminal and said first main electrode connected to said gate electrode of said first N-channel transistor;

a switching transistor having first and second main electrodes and a gate electrode, said first main electrode connected to said positive voltage terminal, said gate electrode connected to a carry input terminal connected to the carry output terminal of the preceding adding stage; and a second inverter having an input and an output, said input connected to said first main electrode of said third N-channel transistor and to said second main electrode of said switching transistor, said output connected to the summing circuit in the preceding adder stage.

16. A parallel adder as defined in claim 1, wherein the carry input terminal and the carry output terminal of an adding stage are coupled to said summing circuit of said adding stage via a load buffer device.

17. A parallel adder as defined in claim 16, wherein said load buffer device associated with the carry input terminal of an adding stage also forms the load buffer device associated with the carry output terminal of the next preceding adding stage.

18. A parallel adder as defined in claim 1, further comprising a carry feedback circuit and a carry selection circuit, wherein:

the carry output signal generated by the highest-order adding stage and appearing at the carry output terminal of said highest-order adding stage is made available to the carry input terminal of the lowest-order adding stage via said carry feedback circuit;

said carry feedback circuit places its output in a preset state representing no carry prior to receiving the carry output signal from the highest-order adding stage; and said carry selection circuit selects one of the carry calculated by the highest-order adding stage, a carry flag signal, or a constant binary "1" or "0" to apply to the carry input terminal of the lowest-order adding stage of the parallel adder.

19. A parallel adder as defined in claim 18, wherein: said carry feedback circuit comprises:

a first series combination of a first P-channel transistor, a second P-channel transistor, and a first N-channel transistor, each having first and second main electrodes and a gate electrode;

a second series combination of a third P-channel transistor and a second N-channel transistor, each having first and second main electrodes and a gate electrode; and first and second inverters, each having an input and an output; wherein said second main electrode of said first N-channel transistor is connected to said negative voltage terminal, said first main electrode of said first P-channel transistor is connected to said positive voltage terminal, and said gate electrodes of said first N-channel transistor and said first P-channel transistor are driven jointly by a presetting-signal source;

said first main electrode of said second P-channel transistor is connected to said second main electrode of said first P-channel transistor, said second main electrode of said second P-channel transistor is connected to said first main electrode of said first N-channel transistor at a first node, said gate electrode of said second P-channel transistor is supplied with the carry output from the highest-order adding stage;

said first main electrode of said third P-channel transistor is connected to said positive voltage terminal and said second main electrode of said second N-channel transistor is connected to said negative voltage terminal;

said second main electrode of said third P-channel transistor and said first main electrode of said second N-channel transistor are connected at a second node to provide a carry output signal from said carry feedback circuit;

said input of said first inverter is connected to said gate electrode of said first P-channel transistor, and said output of said first inverter is connected to said gate electrode of said third P-channel transistor; and said gate electrode of said second N-channel transistor and said input of said second inverter are connected to said first node, said output of said second inverter providing an output connected to the summing circuit in said highest-order adding stage; and said carry selection circuit comprises:

a third series combination of a fourth P-channel transistor and a third N-channel transistor, each having first and second main electrodes and a gate electrode;

a fourth N-channel transistor having first and second main electrodes and a gate electrode;

a NOR-gate having first and second inputs and an output, said output connected to said gate electrode of said fourth P-channel transistor;

selection logic having first, second and third control inputs, a carry flag input, a preset signal input, a first output connected to said gate electrode of said third N-channel transistor, a second output connected to said gate electrode of said fourth N-channel transistor, and a third output connected to said first input of said NOR-gate; and a pulse shaper circuit having an input connected to receive a presetting signal, and having an output connected to said second input of said NOR-gate; wherein:

said first main electrode of said fourth P-channel transistor is connected to said positive voltage terminal and said second main electrode of said third N-channel transistor is connected to said negative voltage terminal;

said second main electrode of said fourth P-channel transistor, said first main electrode of said third N-channel transistor and said first main electrode of said fourth N-channel transistor are connected at a third node and provide the carry output signal to the highest-order adding stage;

said second main electrode of said fourth N-channel transistor is connected to said carry output signal from said carry feedback circuit;

said selection logic receives and evaluates control signals applied to said first, second and third control signal inputs, a carry flag signal applied to said carry flag input, and a preset signal applied to said preset signal input, and responsive thereto applies signals to one of said first, second and third outputs to enable a respective one of said third N-channel transistor, said fourth N-channel transistor and said fourth P-channel transistor, such that, depending on the occurrence of said control signals, either: (1) said carry output signal applied from said carry feedback circuit is transferred through said fourth N-channel transistor to said carry output of said carry selection circuit; or (2) said fourth P-channel transistor is enabled to provide a constant binary "1" to said carry output; or (3) said third N-channel transistor is enabled to provide a constant binary "0" to said carry output; or (4) said carry flag signal is communicated to said carry output; and said pulse shaper drives said fourth P-channel transistor into a conducting state for a short time via said NOR-gate so that said third node is preset.

* * * * *